US006698900B1

United States Patent
Young et al.

(10) Patent No.: US 6,698,900 B1
(45) Date of Patent: Mar. 2, 2004

(54) REVERSE PROJECTION SYSTEM FOR MOVING IMAGERY

(75) Inventors: Joanne Young, Merritt Island, FL (US); Ward H. Davis, Orlando, FL (US)

(73) Assignee: Audio Visual Imagineering, Inc., Orlando, FL (US)

(*) Notice: Subject to any disclaimer, the term of this patent is extended or adjusted under 35 U.S.C. 154(b) by 217 days.

(21) Appl. No.: 09/666,285

(22) Filed: Sep. 21, 2000

Related U.S. Application Data
(60) Provisional application No. 60/202,071, filed on May 5, 2000, and provisional application No. 60/155,065, filed on Sep. 21, 1999.

(51) Int. Cl.[7] ............................................. G03B 21/14
(52) U.S. Cl. ........................................................ 353/79
(58) Field of Search ............................. 353/28, 12, 13, 353/79, 74, 76; 359/451, 460

(56) References Cited

U.S. PATENT DOCUMENTS

| | | | | |
|---|---|---|---|---|
| 346,924 A | * | 8/1886 | Knell | .......................... 353/28 |
| 2,592,444 A | * | 4/1952 | Matelena | ..................... 353/28 |
| 3,699,244 A | | 10/1972 | Cohen et al. | |
| 4,297,723 A | | 10/1981 | Whitby | |
| 4,597,633 A | * | 7/1986 | Fussell | ......................... 353/13 |
| 4,763,280 A | | 8/1988 | Robinson et al. | |
| 4,979,030 A | | 12/1990 | Murata | |
| 5,071,209 A | * | 12/1991 | Chang et al. | .................. 359/19 |
| 5,255,082 A | | 10/1993 | Tamada | |
| 5,546,139 A | | 8/1996 | Bacs, Jr. et al. | |
| 5,649,827 A | * | 7/1997 | Suzaki | ......................... 434/284 |
| 5,762,413 A | * | 6/1998 | Colucci et al. | .............. 353/122 |
| 6,231,189 B1 | * | 5/2001 | Colucci et al. | ................ 353/20 |

FOREIGN PATENT DOCUMENTS

| | | |
|---|---|---|
| DE | 19641657 | 10/1996 |
| DE | 19628455 | 1/1998 |

* cited by examiner

*Primary Examiner*—William Dowling
(74) *Attorney, Agent, or Firm*—Baker Botts L.L.P.

(57) ABSTRACT

A projection and display system for reverse projection of imagery includes an imagery projection system having a lens barrel for projecting images. The imagery projection system extends into a substantially closed, geometric viewing surface, such that the lens barrel is disposed at a predetermined distance from and at a predetermined orientation relative to an interior surface of the geometric viewing surface. The images are projected onto an interior surface of the geometric viewing surface. The images may be defined in vector coordinates or in raster coordinates.

12 Claims, 14 Drawing Sheets

REVERSE PROJECTION SYSTEM FOR MOVING IMAGERY

The present application claims priority from U.S. Provisional Patent Application No. 60/202,071, entitled "Reverse Projection System For Moving Imagery," filed May 5, 2000, and U.S. Provisional Patent Application No. 60/155,065, entitled "Reverse Projection System For Moving Imagery," filed Sep. 21, 1999, which are incorporated herein by reference.

BACKGROUND OF THE INVENTION

1. Field of the Invention

The invention relates to a reverse projection system for imagery, in which an imagery projection system is placed wholly or partially within a substantially closed, translucent geometric viewing surface and by which images are visible to an observer from outside the substantially closed, viewing surface. In particular, the invention relates to a reverse projection system for moving imagery, in which a moving imagery projection system is placed wholly or partially within a translucent balloon or globe.

2. Description of Related Art

Projection systems are currently used to project moving or still images onto geometric, e.g., domed or hemispherical, viewing surfaces. Some examples of these systems and their viewing surfaces are starfield projectors which project stationary or moving images onto the interior surface of planetarium domes or laser projectors which project laser beams forming stationary or moving images onto geometric viewing surfaces or screens. Such systems suffer from several disadvantages. First, the projected images may only be viewed by observers positioned beneath or in front of the viewing surface. Thus the number of observers is limited by the number of viewing positions that may be located before or beneath the viewing surface. This number is usually less than the absolute number of persons capable of observing the viewing surface because observers viewing the surface from extreme angles may experience unacceptable image distortion. Second, the clarity of the observed images may be adversely effected by the physical condition of the viewing surface. For example, warping of the viewing surface and damaged or deteriorating coatings on the viewing surface (e.g., peeling or "yellowings paint or flaking plaster) may cause image distortion. Third, with respect to planetariums, the viewing surface must be free from obstructions such as supporting beams or columns. This requirement imposes architectural limitations on the on the size of the viewing surface and the number of observers who may be placed beneath it.

SUMMARY OF THE INVENTION

A need has arisen for a reverse projection system for imagery, which permits viewing of stationary or moving images on a substantially closed, viewing surface. The system may be used to generate images for educational or entertainment purposes, or the like. In particular, the viewing surface may comprise a rigid viewing surface, such as a self-supporting globe, sphere, or other geometric shape, manufactured from a translucent plastic or glass or the like. Alternatively, the viewing surface may comprise a non-rigid or semi-rigid viewing surface, such as an inflated balloon having a globe, sphere, or other geometric shape, manufactured from a translucent plastic or fabric, or the like. Such balloon viewing surfaces may be inflated with a gas or a combination of gasses, e.g., helium or hydrogen, or with heated air, or with the like.

By allowing the images to be observed from the exterior of the viewing surface, the number of observers capable of watching the moving or stationary images can be greatly increased. Further the images may be shown at essentially any location at which observers may gather. However, the projection systems of the present invention may be especially well suited to displaying stationary or moving images to observers in arenas, stadiums, amphitheaters, ballparks, or other venues having tiered seating arrangements.

In an embodiment, a projection and display system for reverse projection of imagery may comprise an imagery projection system having a lens barrel for projecting at least one image. The imagery projection system extends into a substantially closed, geometric viewing surface, such that the lens barrel is disposed at a predetermined distance from and at a predetermined orientation relative to an interior surface of the geometric viewing surface. The at least one image is projected onto an interior surface of the geometric viewing surface. The image may be defined in vector coordinates or in raster coordinates.

Various configurations for the viewing surface are possible. The viewing surface may be rigid, e.g., a globe, semi-rigid, or non-rigid, e.g., a balloon. Moreover, the viewing surface may be integral or may be formed in segments which form a continuous or discontinuous viewing surface. Nevertheless, each configuration must be at least partially translucent or at least partially transparent, or both, so that the images projected on the interior of the viewing surface may be seen by observers on the exterior of the viewing surface.

The imagery projection system may be a moving imagery projection system comprising a source of an intense light beam; a scanning deflector module for deflecting the light beam to the coordinates in a pair of Cartesian axes at an exit angle of deflection of the light beam; and a wide angle lens array for increasing the exit angle of deflection by a predetermined factor and projecting the image on the viewing surface. For example, an OMNISCAN™ laser imagery projection system, available from Audio Visual Imagineering, Inc., of Orlando, Fla., may be adapted to project suitable images. The deflector module may be a vector scanning deflector module or a raster scanning deflector module. The generated light beam may be a laser beam.

In another embodiment of the invention, a mobile, reverse projection system comprises an electronic control unit (ECU) and a projection head mounted on a balloon, wherein the projection head and the ECU are joined by an umbilical cord. The umbilical cord comprises at least one power transfer cable to supply power and data to a plurality of deflectors in the projection head and at least one fiber optic cable to transfer light from a light source in the ECU to the projection head for projection within the balloon. The umbilical cord may be sheathed with a material selected from the group consisting of a metal, a polymer, a composite material including glass fibers, or combinations thereof. Further, the umbilical cord may have a strengthened core of a material selected from a group consisting of a metal, a polymer, a composite material including glass fibers, or combinations thereof.

The system also may comprise a first coupler which joins the umbilical cord to the ECU. The projection head includes a second coupler which joins the umbilical cord to the deflectors in the projection head, wherein a second junction pivotally connects the umbilical cord to the second coupler in the projection head. The first coupler also may include a first junction which connects the umbilical cord to the first coupler. Moreover, the first junction pivotally may connect the umbilical cord to the first coupler.

As noted above, the viewing surface may be translucent or may comprises at least one transparent portion, such that at least a portion of the at least one image projected within the viewing surface escapes through the at least one transparent portion of the viewing surface. Further, if the viewing surface is a balloon, the balloon may be partially transparent, such that at least a portion of the light projected with the balloon escapes from within the balloon.

The ECU may have a plurality of wheels. Alternatively, the ECU may be carried on an aircraft, e.g., an airship or a helicopter, or a watercraft, e.g., a boat, ship, or barge. Moreover, if the viewing surface is a balloon, the balloon and projection head may suspended beneath an overhead mounted ECU.

In still another embodiment, a reverse projection system for imagery may include an imagery projection system and a substantially closed, translucent geometric viewing surface, wherein at least a projector or lens array of the imagery projection system is partially enclosed by the translucent viewing surface. The viewing surface may be sealed around the imagery projection system by a collar at its point of insertion into the viewing surface.

In yet another embodiment, a reverse projection system for imagery may include an imagery projection system and a translucent balloon or globe, wherein at least a projector or lens array of the imagery projection system may be wholly or partially enclosed by the translucent balloon or globe. If at least the projector or lens array of the imagery projection system is partially enclosed by the translucent balloon, the balloon or globe may sealed around the imagery projection system by a collar, at its point of insertion into the balloon. The balloon may be inflated with compressed or heated air or another fluid or gas, such as helium or hydrogen, and the seal around a partially inserted imagery projection system (e.g., around a projection head from which light (or laser) beams for generating the images emanate) may be substantially fluid-or gas-tight. Alternatively, the viewing surface may be a rigid viewing surface such as a globe surrounding a projection head from which light (or laser) beams for generating the images emanate.

In a further embodiment of the system, the components of a laser projection system may be separated from each other and light may be transferred between the components by means of fiber optic cables. Thus, the laser or other source of an intense light beam may be located remotely from the other components of the projection system. A projection head may be located remotely from the light beam source and may comprise a lens array for focusing the image onto the interior surface of the viewing surface and a scanning deflector module, such as a vector or raster scanning deflector module for deflecting the light beam through the lens array in a pair of Cartesian axes. The light beam source and ancillary, system components, such as power supplies and computers for generating graphic imagery, may be carried in the ECU. The components located in the ECU may be connected to the projection head by means of a fiber optic umbilical cord. Thus, for example, the projection head may be mounted in an inflated balloon hovering aloft. Such a hovering projector head may receive electric and optical input via a fiber optic umbilical cord from an ECU on the ground. Moreover, the ECU may be mobile or even self-propelled, so that it may follow remotely below the hovering projection head and the balloon.

Alternatively, the balloon or globe may be suspended from a trapeze or guiding arm, by which it may be moved through a confined space such as an arena, a stadium, or a tent, or the like. Similarly, the balloon or globe may be suspended from a helicopter, a blimp, or other rigid or non-rigid aircraft, including another balloon.

Other objects, features and advantages of this invention will be apparent from the enclosed drawings and the following detailed description of preferred embodiments.

DESCRIPTION OF THE DRAWINGS

Reference now is made to the following description taken in conjunction with the accompanying drawings, in which like reference numerals represent like referenced parts, wherein:

FIG. 9b depicts an exploded view of the collar attachment of FIG. 9a.

DESCRIPTION OF PREFERRED EMBODIMENTS

Figure 1:
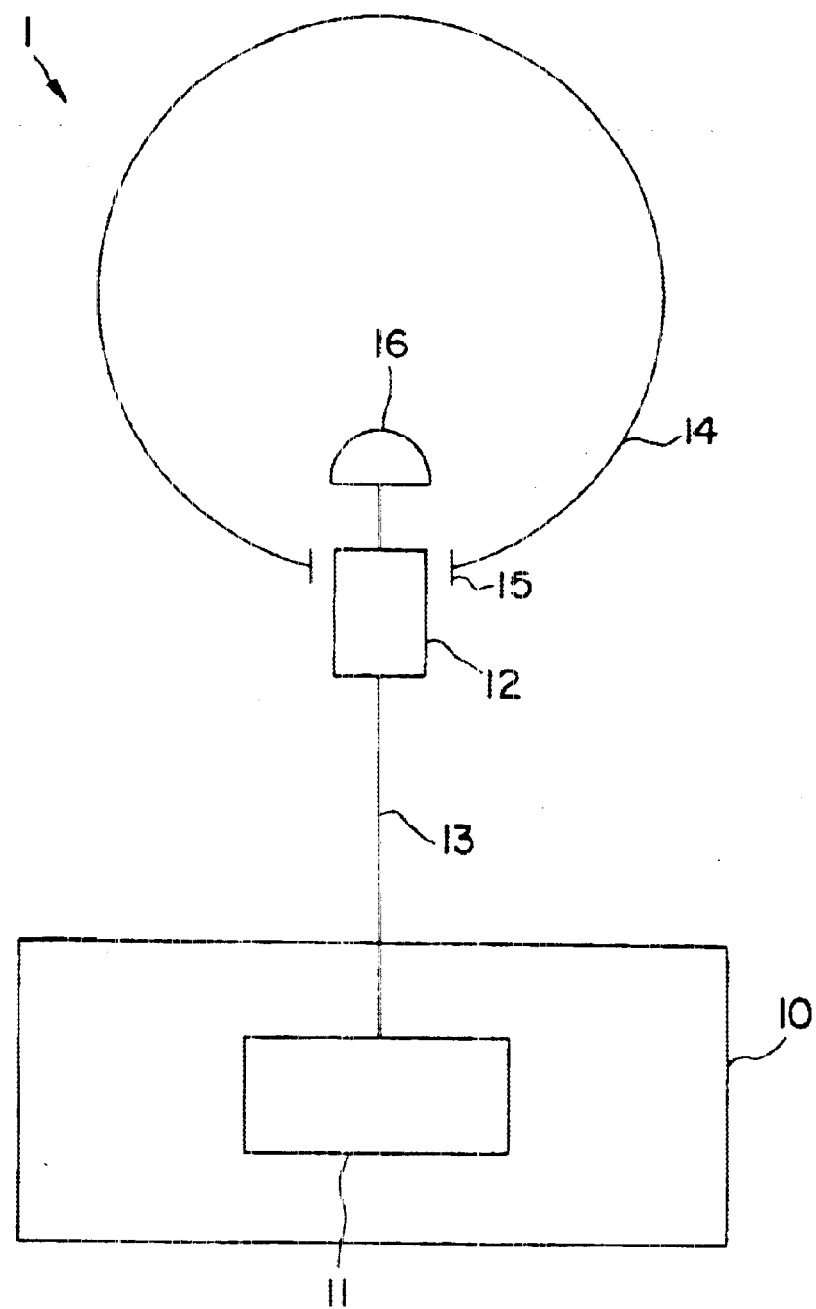
FIG. 1 is a schematic showing the basic elements of the invention.

Referring to FIG. 1, a schematic shows the basic elements of a projection and display system of the present invention. System 1 comprises an electronics control unit (ECU) 10. ECU 10 includes a laser 11 and may include a power source and other ancillary systems equipment (not shown), as described below. ECU 10 and laser 11 may be connected to a projection head 13 by an umbilical cable 13. Umbilical cable 13 may include one or more fiber optic cables for transferring light from laser 11 to projection head 12.

Umbilical cable 13 may include a reinforcing cable made from steel or another suitable metal or a sheathing of kevlar or a similar protective polymer. Umbilical cable 13 may also include transmission cables, which also may be fiber optic cables, for transferring directional and other instructions from ECU 10 to projection head 12. Finally, umbilical cable 13 may include transmission lines for transferring power from ECU 10 to projection head 12.

Finally, projection head 12 may be secured within a closed, geometric viewing surface 14 by a collar 15. Images are transferred from ECU 10 to projection head 12 and then are deflected onto the interior surface of viewing surface 14 via lens array 16. Viewing surface 14 must be at least partially translucent or partial transparent, or both, so that observers may view the projected images through transparent portions of the viewing surface or projected on translucent portions.

Figure 2:
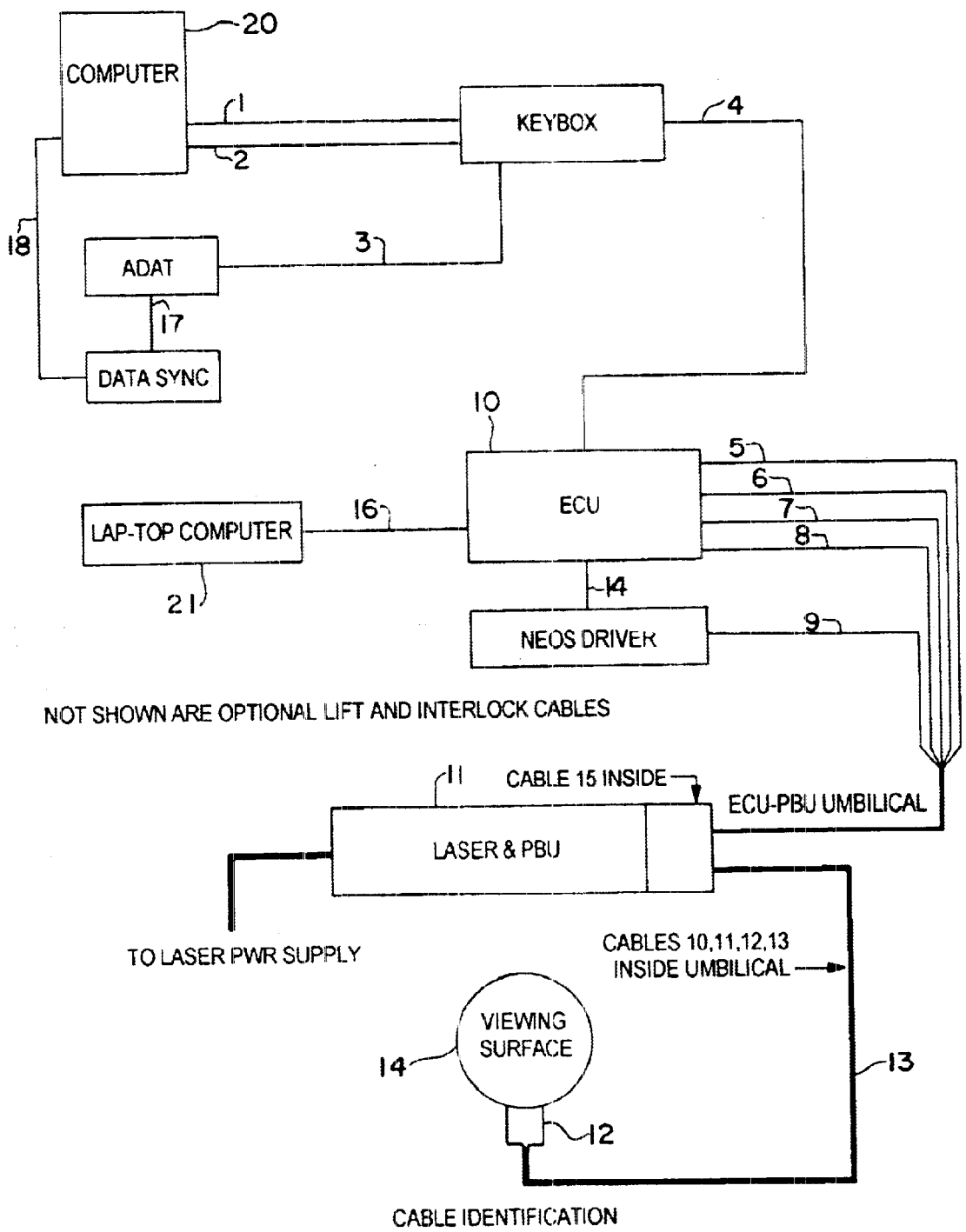
FIG. 2 is a block diagram showing the cable interconnections of an embodiment of the invention.

Referring to FIG. 2, a block diagram shows the cable interconnections of an embodiment of the invention. As discussed above, umbilical cable 13 may include more than one cable for transferring images, power, and instructions from ECU 10 and laser 11 to projection head 12. As shown in this figure, laser 11 may be a component of ECU 10 or may be a separate element of the system. Further, images may be generated by a PC or other computer 20 or by a laptop computer 21 and transmitted via cables 4 or 16, respectively, to ECU 10. These computer generated images may be used to generate control instructions for projection head 12 in ECU 10. Other peripheral components of computer 20 are also depicted in this figure.

Figure 3:
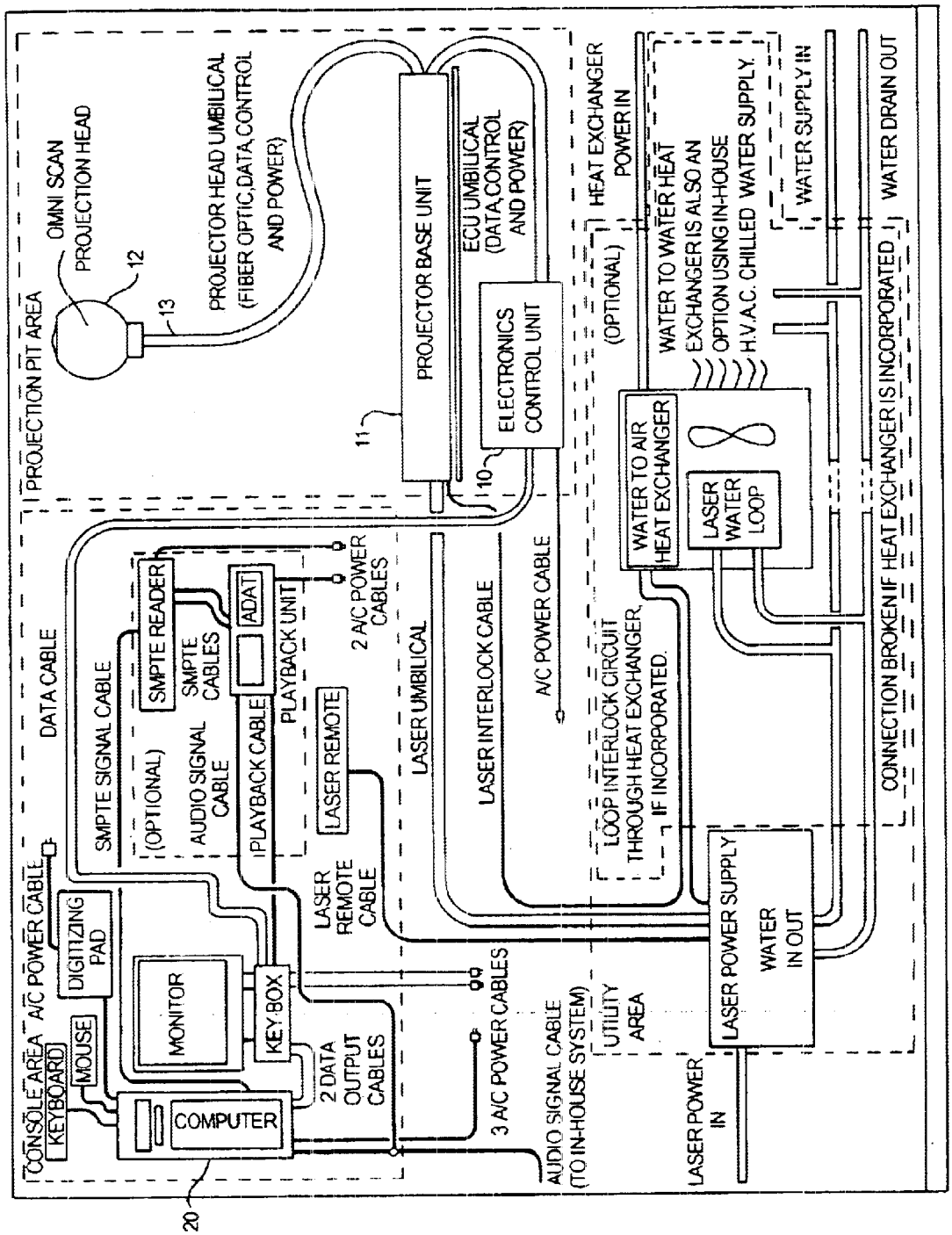
FIG. 3 is block diagram of an embodiment of the OMNISCAN™ laser projection system.

FIG. 3 is block diagram of an embodiment of the OMNISCAN™ laser projection 10 system. This system may be adapted to supply ECU 10, laser 11, projection head 12, umbilical cable 13, and lens 16. The disclosure of U.S. Pat. No. 5,546,139 to Bacs Jr. et al. (copy attached) is incorporated herein by reference. This patent describes a projection system for projecting an image onto a geometric viewing surface, such as a domed or spherical viewing surface. The image is defined in vector coordinates, and the viewing surface is located at a predetermined distance from and positioned at a predetermined orientation relative to the system. The system includes a source of an intense light beam, e.g., a laser; a vector scanning deflector module for deflecting the light beam to the vector coordinates in a pair of Cartesian axes at an exit angle of deflection of the light beam; and a wide angle lens array for increasing the exit angle of deflection by a predetermined factor and projecting the image on the viewing surface. For example, the OMNISCAN™ laser projection system, manufactured and sold by Audio Visual Imagineering, Inc. of Orlando, Fla., U.S.A., is a suitable, imagery projection system.

Figure 4:
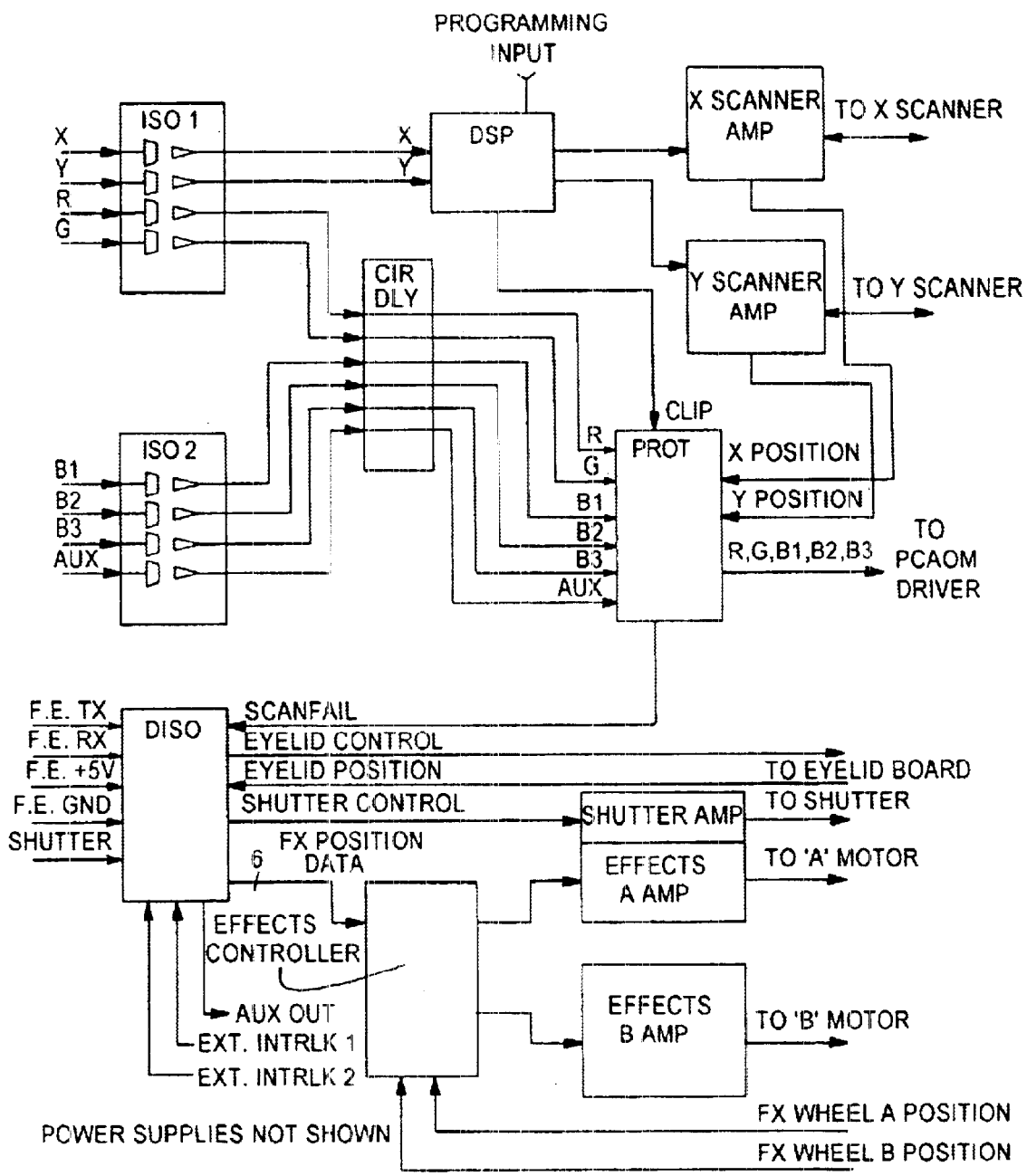
FIG. 4 is a block diagram of the electronic control unit (ECU).

Referring to FIG. 4, a block diagram of ECU 10 is shown. This particular block diagram is of an ECU suitable for use with the OMNISCAN™ laser projection system Referring to FIG. 5, a perspective view of a reverse projection system 50 for imagery includes a projection head 51 mounted on a frame 52 by means of a collar (not shown) and inserted into a translucent, spherical, viewing surface 53. Frame 53 may further include a left stabilizing leg 54 and a left supporting brace 56 and a left stabilizing leg 55 and a left supporting brace 57. Projection head 51 is suspended above and extends into substantially closed, translucent spherical, viewing surface 53. In the perspective view, color imagery, e.g., moving color imagery, generated by the imagery projection system is visible from the exterior of the viewing surface by exterior observers. In addition, an optional coherent light, e.g., laser, projector, (not shown) may be mounted above the imagery projection system.

Figure 5:
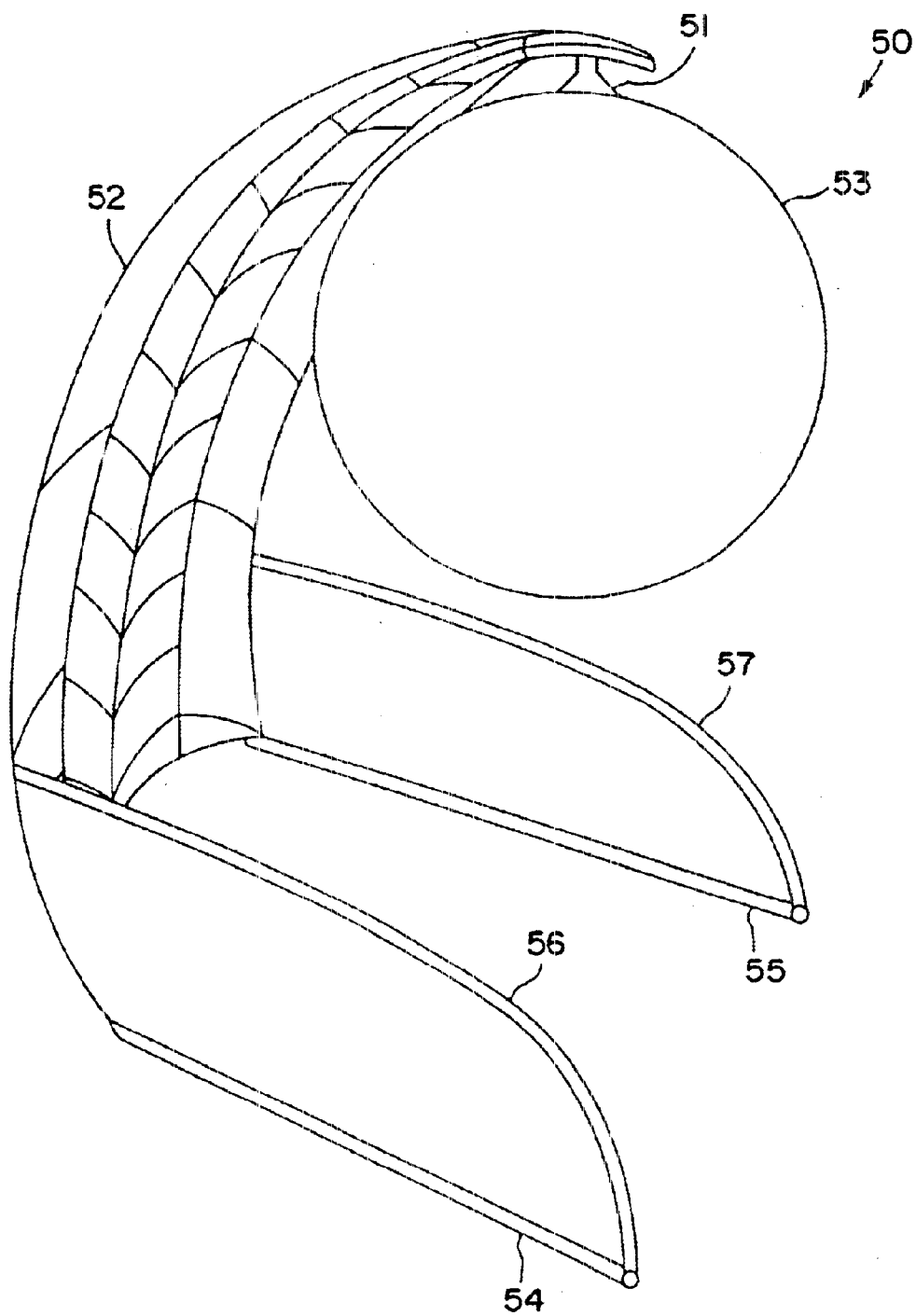
FIG. 5 depicts a perspective view of a reverse projection system for imagery projection system mounted on a frame and inserted into a translucent viewing surface.
Figure 6:
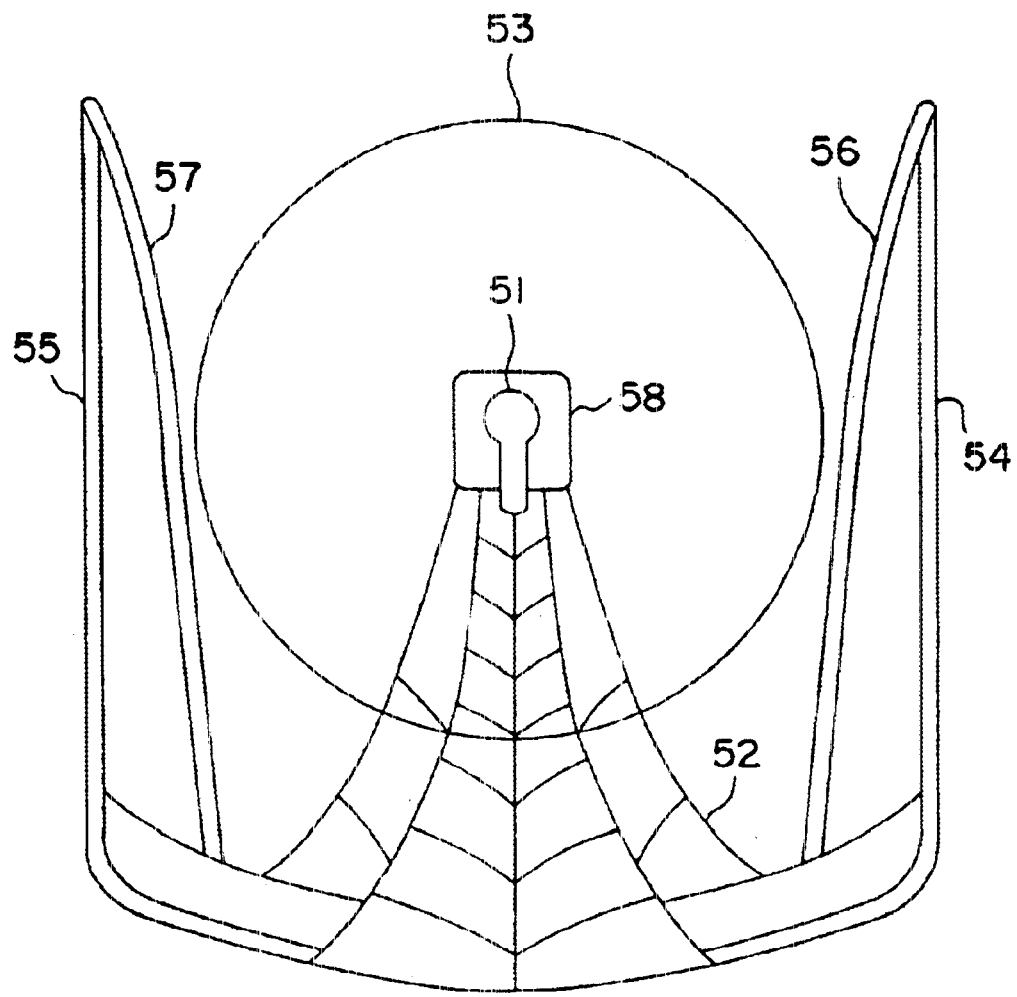
FIG. 6 depicts an overhead view of the reverse projection system of FIG. 5.

In FIG. 6, an overhead view of the reverse projection system of FIG. 5. In this view the frame members 52a–d are shown to join together in a platform 58, on which the projection head 51 is mounted and from which viewing surface 53 is suspended.

As noted above, the viewing surface may be a rigid, semi-rigid, or non-rigid structure. If the viewing surface is a rigid structure, the surface may be a globe, a sphere, or any other geometric structure. The size of the rigid structure may be limited by the requirement that the viewing structure is self-supporting in the absence of additional, internal or external supporting structures. Such additional structures are undesirable. Internal structures may interfere with the propagation of light from the projector head. External structures may interfere with the observers' view of the imagery formed on the viewing surface. Further, the size of a rigid viewing surface may be limited by the permissible thickness of the viewing surface for a given material. The viewing surface material must have a thickness and light transmission properties, such that imagery projected on the interior surface of the viewing surface is visible on the exterior surface of the viewing surface without unacceptable distortion or loss of intensity. Acceptable distortion and intensity loss are dependent upon the positioning of observers with respect to the viewing surface. Because the semi-rigid and non-rigid viewing surfaces are supported by the inflating gas or gasses or (fluid or fluids), the viewing surface material may be much thinner than in a rigid viewing surface. Suitable balloons may have a diameter in a range of about 1.6 meters (about 5.25 feet) to about 10 meters (about 33 feet), but may be larger or smaller depending upon the site or application.

Suitable balloons for use in this invention are distributed by Airstar Company of Orlando, Fla., U.S.A. These balloons include:

| Model | Diameter |
| --- | --- |
| Crystal 160 Envelope | 1.6 m |
| Lunix Solarc 300 Envelope | 3.0 m |
| Lunix Solarc 370 Envelope | 3.7 m |
| Lunix Solarc 500 Envelope | 5.0 m. |

Airstar also distributes a suitable balloon with a 10 meter diameter. The balloons with diameters of 5 and 10 meters are suitable for lifting carrying a projection head aloft. The projection head weighs about 20.45 kg and the 5 meter balloon filled with helium has enough lift to carry the projection head. The helium filled, 10 meter balloon has a lift of about 45 kg.

Figure 7:
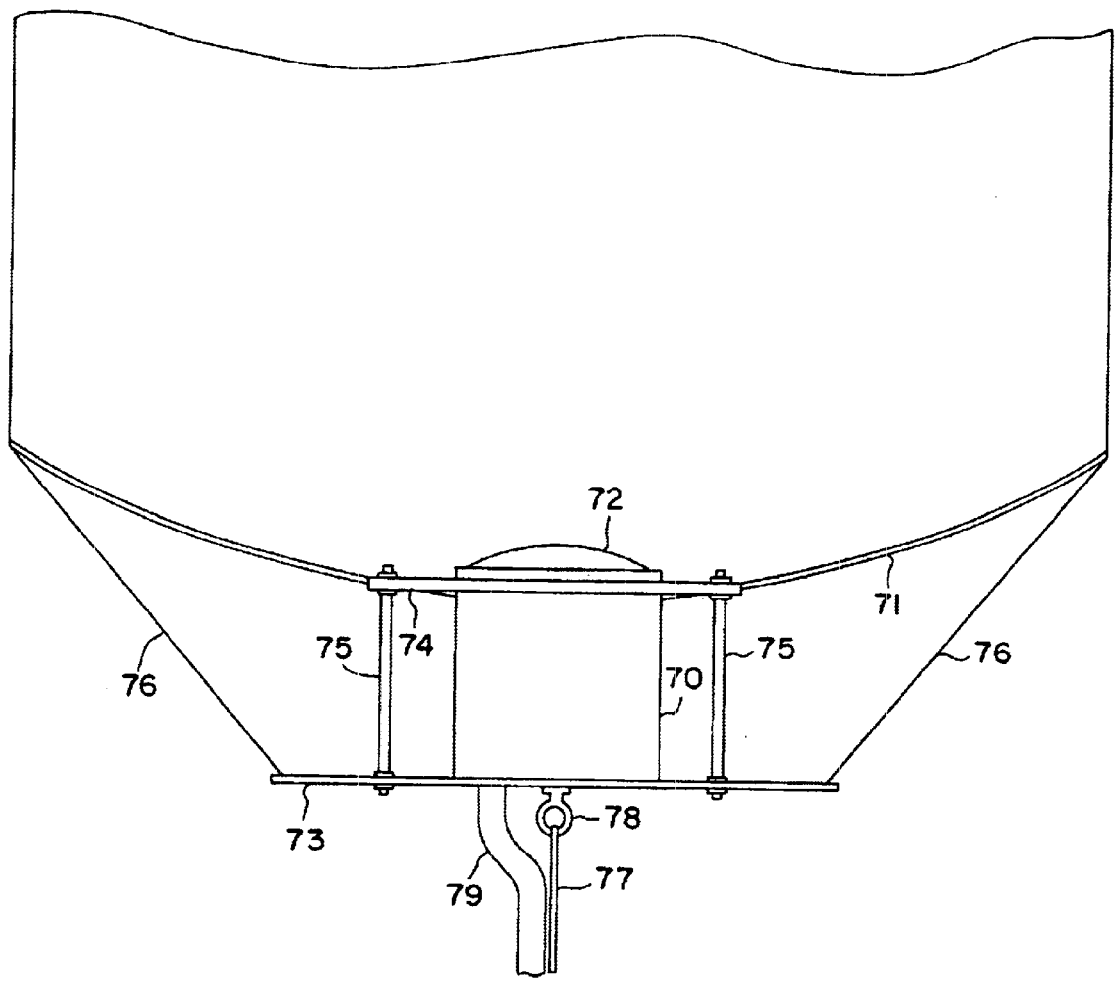
FIG. 7 depicts a side view of a projection head mounted on and suspended beneath a balloon.

Referring to FIG. 7, a projection head 70 is shown inserted into and affixed to a balloon 71, which acts a the viewing surface for images projected from lens 72. Projection head 70 is mounted on a projection head platform 73, and attached to balloon 71 by a collar 74. Projection head platform 73 may be made from metal, plastic, or any other lightweight, but rigid, material. Projection head platform 73 is affixed to collar 74 by a plurality of positioning bolts 75. Positioning bolts 75 and projection head platform 73 work in conjunction with collar 74 to stabilize projection head 70 in balloon 71. In addition, a plurality of tethers 76 further stabilize projection head 70 by securing projection head platform 73 directly to balloon 71.

A securing tether 77 is affixed to an eye-ring 78 that is attached to the lower surface of projection head platform 73.

An umbilical cable 79 is attached to projection head 70 via an opening in projection head platform 73. As noted above, umbilical cable 79 may transfer light via optical fibers from a laser, electrical power, or image generating instructions to projection head 70. Alternatively, securing tether 77 may be included within or made integrally with umbilical cable 79.

Figure 8:
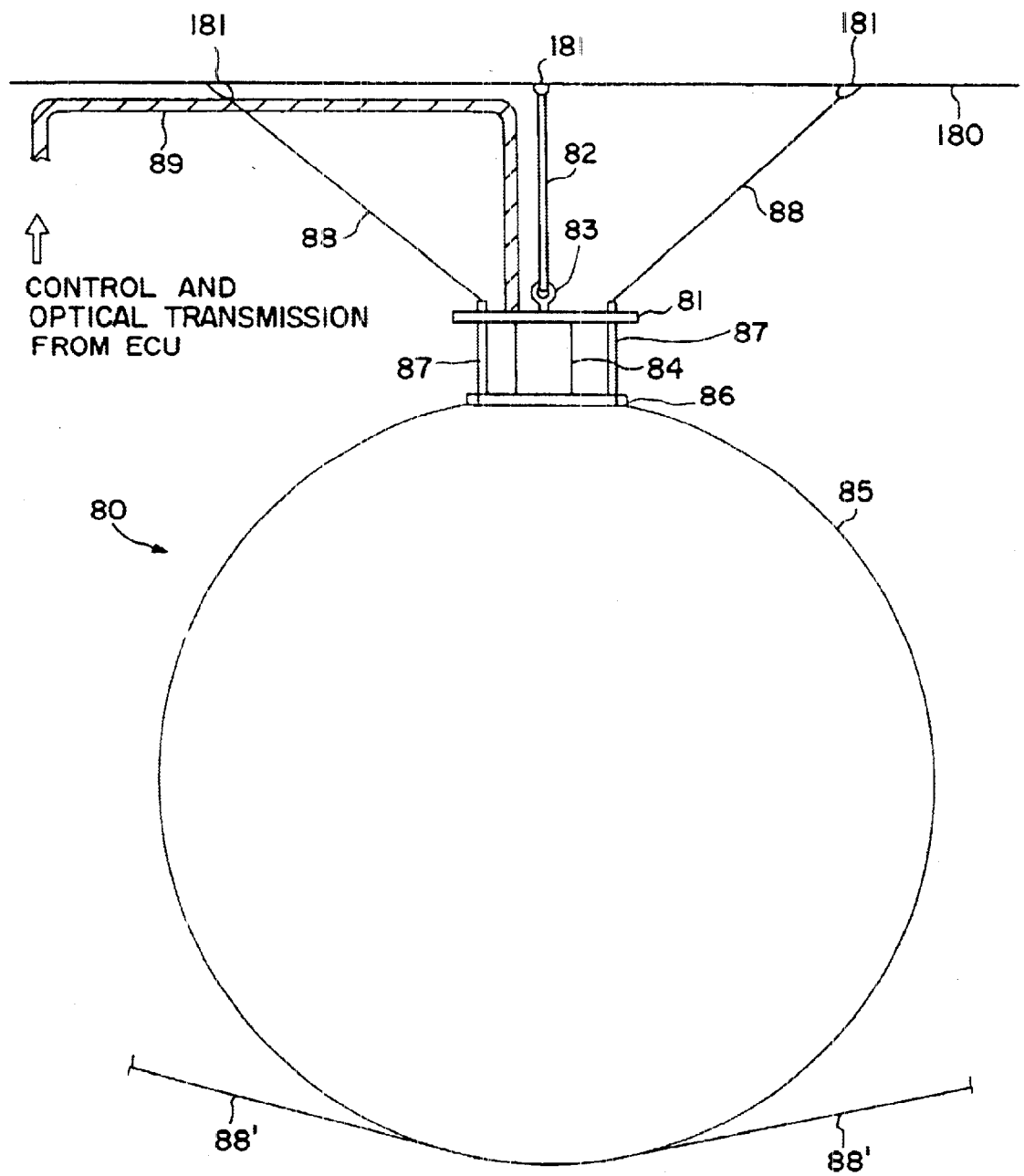
FIG. 8 depicts a side view of a projection head mounted on a balloon, wherein the projection head and the balloon are suspended from a ceiling.

In FIG. 8, a projection and display system 80 for reverse projection of imagery is shown suspended from an overhead surface or ceiling 180. A projection head platform 81 is suspended by a securing tether 82 by eye-ring 83. Tether 82 is affixed to ceiling 180 by securing eye-ring 181. A projection head 84 is mounted on a projection head platform 80, and attached to balloon 85 by a collar 86. Projection head platform 80 may be made from metal, plastic, or any other lightweight, but rigid, material. Projection head platform 80 is affixed to collar 86 by a plurality of positioning bolts 87. Positioning bolts 87 and projection head platform 80 work in conjunction with collar 86 to stabilize projection head 84 in balloon 85. In addition, a plurality of tethers 88 further stabilize projection head 84 by securing projection head platform 80 directly to ceiling 180 by stabilizing eye-rings 181. Moreover, additional tethers 88' may be affixed to the lower end of balloon 85, so that both the upper and lower end of balloon 85 are secured.

An umbilical cable 89 is attached to projection head 84 via an opening in projection head platform 80. As noted above, umbilical cable 89 may transfer light via optical fibers from a laser, electrical power, or image generating instructions to projection head 84. Alternatively, securing tether 82 may be included within or made integrally with umbilical cable 89.

Figure 9A:
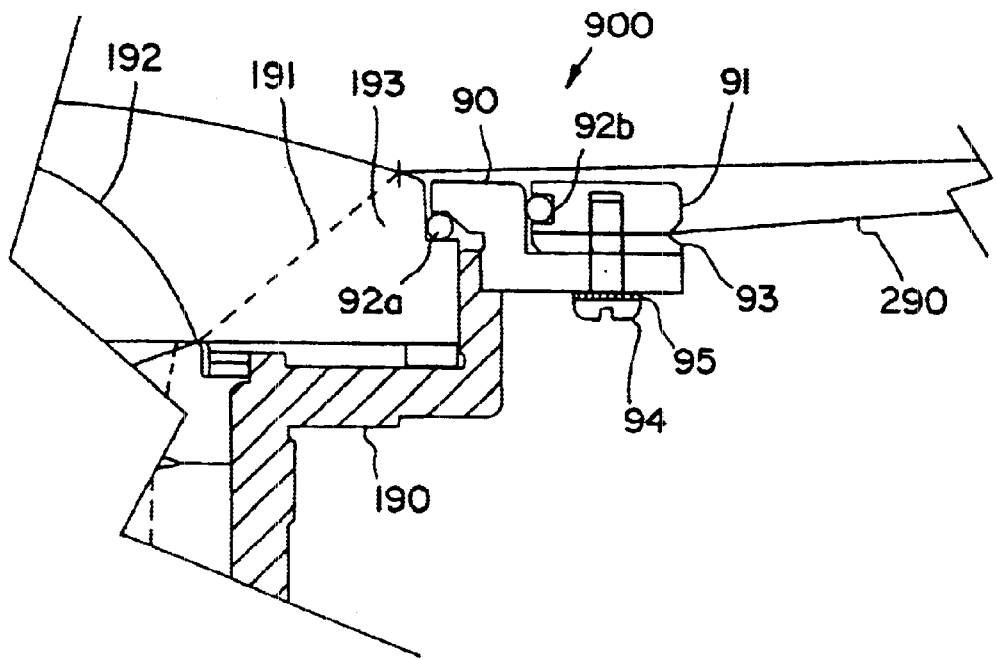
FIG. 9a depicts a partial cross-sectional view of a collar for mounting a projector head to a balloon.

Referring to FIG. 9a, a collar 900 for securing a lens barrel 190 to a balloon 290 is depicted. A inner collar ring 90 surrounds and engages lens barrel 190, and an outer collar ring 91 surrounds and engages inner collar 90. Rings 90 and 91 may be made from metal, plastic, or any other lightweight, but rigid, material. A first o-ring 92a is positioned in a gap between a projection head 193 and inner collar ring 90, and a second o-ring 92b is positioned between inner collar ring 90 and outer collar ring 91 and fitted in a groove formed in outer collar ring 91. Collar 900 is positioned such that it does not interfere with a beam 191 deflected through a lens 192 by the deflectors (not shown) of projection head 193.

Figure 9B:
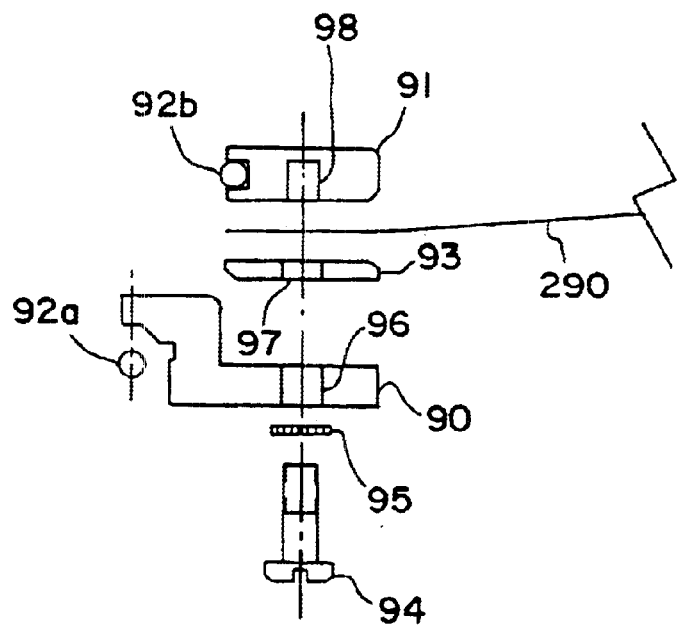

Referring to FIG. 9b, an exploded view of collar 900 of FIG. 9a is depicted. Balloon 290 is placed between a spacer 93 and outer collar ring 91. Balloon 290 may be fitted with a plurality of eyelets (not shown). A bolt 94 may be threaded through a washer 95, then through a first hole 96 in inner collar ring 90 and through a second hole 97 in spacer 93 and finally into a threaded opening 98 in outer collar ring 91. A plurality of bolts 94 may be secured in this manner around the circumference of inner collar ring 90 to secure balloon 290 to lens barrel 190.

Figure 10:
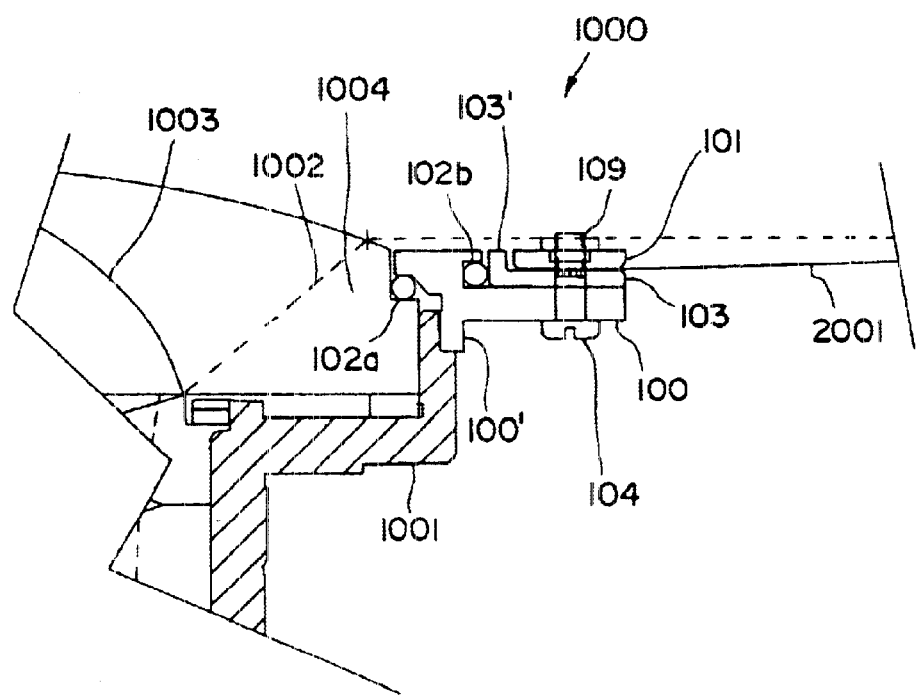
FIG. 10 depicts a partial cross-sectional view of another collar for mounting a projector head to a balloon.

Referring to FIG. 10, a collar 1000 for securing a lens barrel 1001 to a balloon 2001 is depicted. A inner collar ring 100 surrounds and engages lens barrel 1001, and an outer collar ring 101 surrounds and engages inner collar ring 100. Rings 100 and 101 may be made from metal, plastic, or any other lightweight, but rigid, material. A first o-ring 102a is positioned in a gap formed between a projection head 1004 and inner collar ring 100, and a second o-ring 102b is positioned between inner collar ring 100 and a raised lip 103' of spacer 103 and fitted in a groove formed in inner collar ring 100 Inner collar ring 100 seats on lens barrel 1001, and a lip 100' of inner collar ring 100 stabilizes inner collar ring 100 against a portion of lens barrel 1001. Collar 1000 is positioned such that it does not interfere with a beam 1002 deflected through a lens 1003 by the deflectors (not shown) of projection head 1004.

Unlike FIG. 9b, a bolt 104 may be threaded through a first hole in inner collar ring 100 and through a second hole in spacer 103 and finally through a third hole in outer collar ring 101. Bolt 104 is then secured with a nut 109 in the interior of balloon 2001. A plurality of bolts 104 may be secured in this manner around the circumference of inner collar ring 100 to secure balloon 2001 to projection head 1004.

Figure 11:
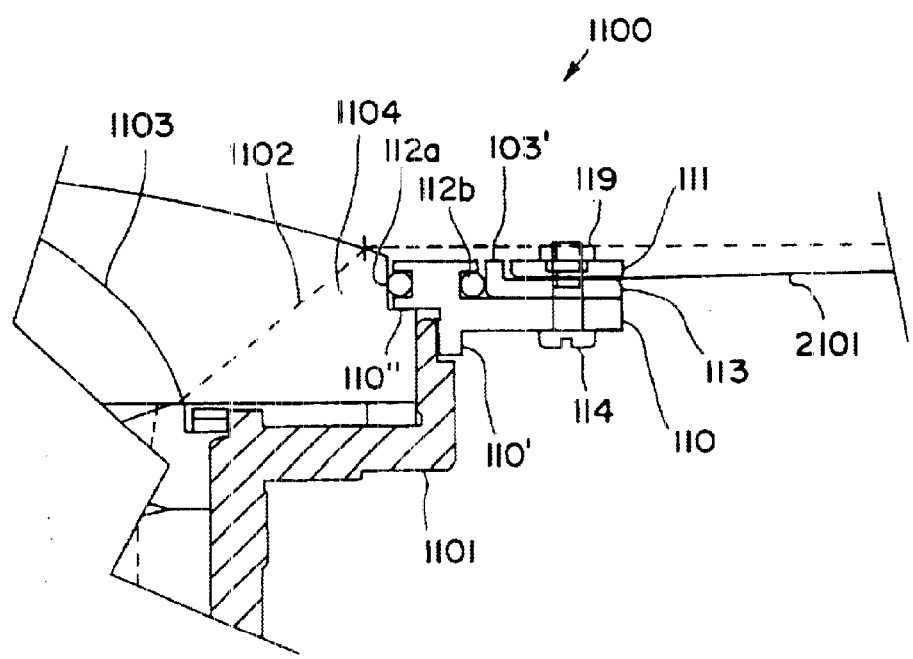
FIG. 11 depicts a partial cross-sectional view of yet another collar for mounting a projector head to a balloon.

Referring to FIG. 11, a collar 1100 for securing a lens barrel 1101 to a balloon 2101 is depicted. A inner collar ring 110 surrounds and engages lens barrel 1101, and an outer collar ring 11 I surrounds and engages inner collar ring 110. Rings 110 and 11 I may be made from metal, plastic, or any other lightweight, but rigid, material. A first o-ring 112a is positioned between a projection head 1104 and inner collar ring 110 and fitted in a groove formed by an inner lip 110" in inner collar ring 110, and a second o-ring 112b is positioned between inner collar ring 110 and a raised lip 113' of spacer 113 and fitted in a groove formed in inner collar ring 110 Inner collar ring 110 seats on lens barrel 1101, and a lip 110' of inner collar ring I 10 stabilizes inner collar ring 110 against a portion of lens barrel 1101. Collar 1100 is positioned such that it does not interfere with a beam 1102 deflected through a lens 1103 by the deflectors (not shown) of projection head 1104.

Again unlike FIG. 9b, a bolt 114 may be threaded through a first hole in inner collar ring 110 and through a second hole in spacer 113 and finally through a third hole in outer collar ring 111. Bolt 104 is then secured with a nut 119 in the interior of balloon 2101. A plurality of bolts 114 may be secured in this manner around the circumference of inner collar ring 110 to secure balloon 2101 to projection head 1104.

The viewing surface may take many forms and may be a rigid, semi-rigid, or non-rigid structure. For example, non-rigid structures may be fabricated from fabric or synthetic materials, such as plastic. Such non-rigid structures may be given shape by inflating them with a gas or heated air. Semi-rigid structures may be created by applying the fabric or synthetic over a rigid frame work. The framework may be geodesic or may include internal supports. A framework without internal supports is preferred because such supports are likely to interfere with the projection of light across the interior of the viewing surface.

Figure 12:
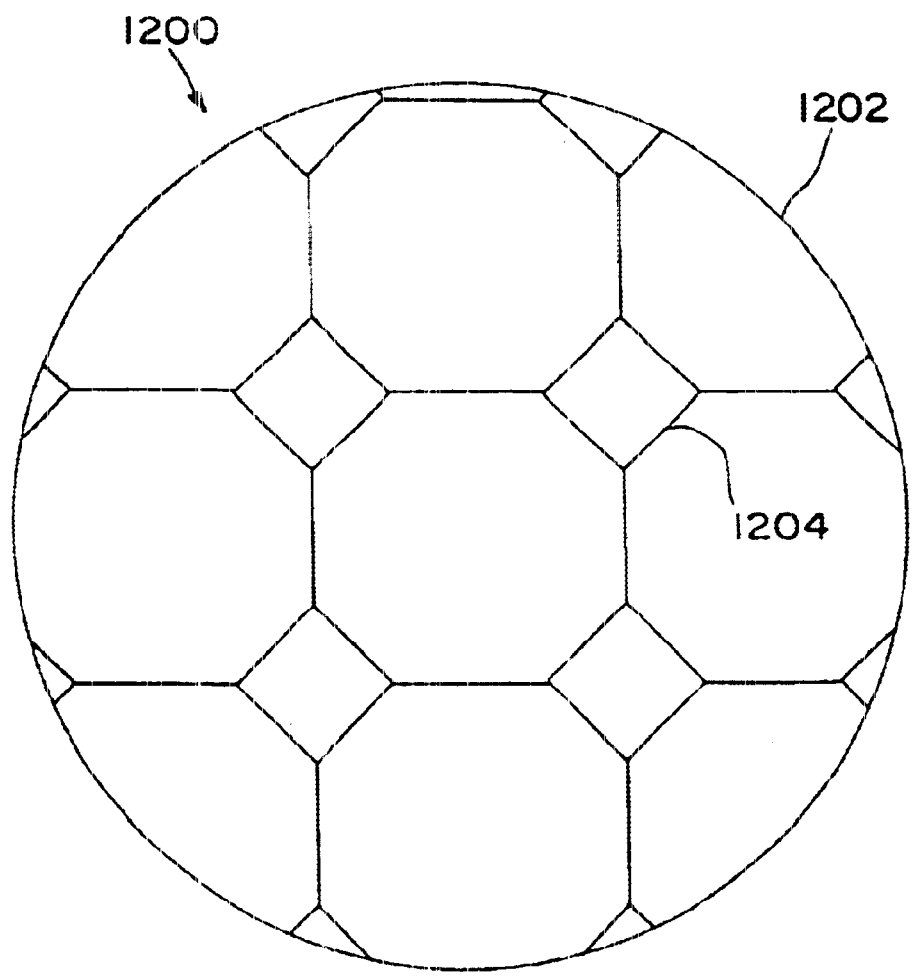
FIG. 12 depicts a sectional, geometric viewing surface.

Alternatively, the viewing surface may be formed as a rigid structure. For example, such a rigid viewing surface may comprise a plurality of tiles or panels, linked together to form a closed viewing surface. In particular, referring to FIG. 12, a viewing surface 1200 may comprise a plurality of triangular, pentagonal, or hexagonal tiles or panels 1202 and 1204, or combinations thereof, joined together at their edges to approximate a sphere. Alternatively, the tiles or panels may be irregularly shaped. The use of such rigid tiles or panels may obviate the need for any supporting structure internal to the viewing surface. Further, the tiles or panels may be translucent or a combination of translucent and transparent. Transparent tiles or panels allow laser or light beams to escape the viewing surface. In addition, viewers may observe images projected on the interior of the viewing surface across the interior of the viewing surface.

Figure 13:
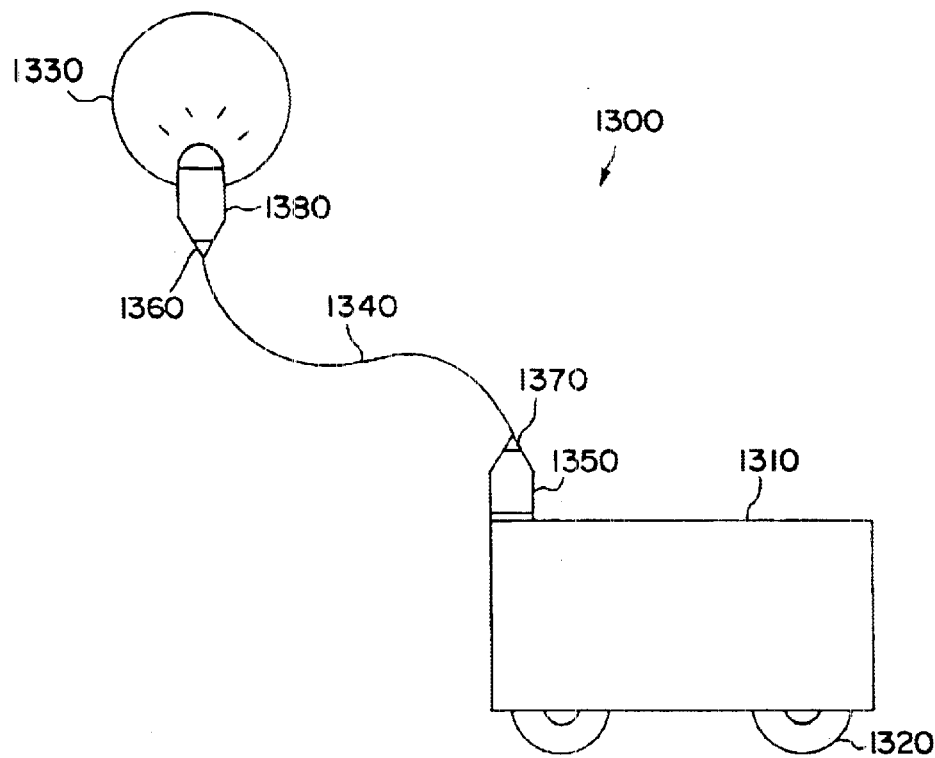
FIG. 13 depicts a balloon-mounted projection head coupled to a wheeled ECU.

Referring to FIG. 13, a mobile, reverse projection system 1300 is depicted comprising an electronic control unit (ECU) 1310 and a projection head 1380 mounted on a balloon 1330. A frame or collar (not shown) forms an air-tight seal between balloon 1330 and projection head 1380. ECU 1310 and all its components may be weather tight and its environment may be controlled to protect the precision optical and electronic equipment carried therein. In an embodiment, ECU 1310 may be equipped with a plurality of wheels 1320 and may be towed or may include a motor or engine, so that ECU 1310 may be self-propelled. Projection head 1380 and ECU 1310 are joined by an umbilical cord 1340. Umbilical cable 1340 is comprised of a communication (scanner and computer) power transfer cable(s) to supply light, data, and power to deflectors, e.g., Cambridge Scanners and Cambridge Scanner amplifiers, manufactured by Cambridge Technology, Inc., Cambridge, Mass., in the projection head and a fiber optic cable (or a bundle of fiber optic cables) to transfer light from the light source in ECU 1310 to the projection head 1330.

Umbilical cable 1340 is sheathed with kevlar, steel, or the like, or it may have a strengthened core of kevlar, steel, or the like, (or a combination of sheathing and a strengthened core) to prevent damage to cord 1340 as a result of hovering balloon 1330 separating from ECU 1310. Umbilical cord 1340 is strengthened to reduce the effects of wind on system 1300 by allowing cord 1340 to withstand being pulled against the relatively heavy ECU 1310. However, cord 1340 also must be resistant to the effects of exposure to the elements, especially rain and condensing fog or mist. Moisture may adversely effect the performance of the fiber optic cable or cables.

In another embodiment, system 1300 includes a first coupler 1350 which joins umbilical cable 1340 to ECU 1310. First coupler 1350 further includes a first junction 1370 which pivotally connects umbilical cord 1340 to first coupler 1350. Similarly, projection head 1380 includes a second coupler (not shown) which joins umbilical cable 1340 to the deflectors in projection head 1380. In addition, a second junction 1360 pivotally connects umbilical cable 1340 to second coupler (not shown) in projection head 1380. In still another embodiment, cable 1340 may be attached directly to points 1380 and 1350, if twisting forces are accounted for during use.

Example

The invention may be further clarified by consideration of the following use, which is intended to be purely exemplary of the use of the invention. In one example of the invention, the OMNISCAN™ projection system was partially inserted into the open neck of a balloon. The balloon was made from translucent, rip stop nylon, and the nylon material was coated with a polymer to prevent leakage of the inflating gas. The balloon had an inflated diameter of about 1.6 meters (about 5.25 feet) and was supplied by Airstar Company of Orlando, Fla., U.S.A. The open neck of the balloon was sealed with an elastic (rubber) band against a lens barrel (which supports the lens array) of the OMNISCAN™ projection system. The balloon was inflated with a colorless compressed gas, i.e., compressed air, such that it was fully inflated and presented a substantially smooth and closed, translucent, viewing surface. The OMNISCAN™ projection system then was operated within the balloon to project moving imagery onto the interior surface of the balloon. Observers viewed these images from outside the balloon.

Figure 14:
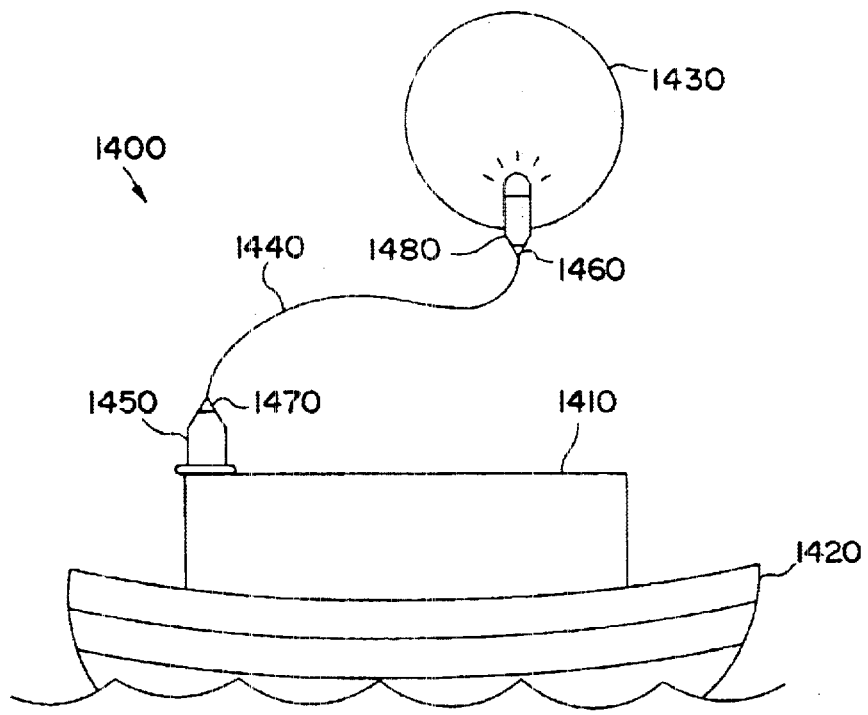
FIG. 14 depicts a balloon-mounted projection head coupled to an ECU placed on a watercraft.

Referring to FIG. 14, a mobile, reverse projection system 1400 is depicted comprising an electronic control unit (ECU) 1410 and a projection head 1480 mounted on a balloon 1430. A frame or collar (not shown) forms an air-tight seal between balloon 1430 and projection head 1480. ECU 1410 and all its components may be weather tight and its environment may be controlled to protect the precision optical and electronic equipment carried therein. In an embodiment, ECU 1410 may be mounted on a watercraft 1420, such as a boat or a ship, which may be towed or may include a motor or engine, so that ECU 1410 may be self-propelled. Projection head 1480 and ECU 1410 are joined by an umbilical cord 1440. Umbilical cable 1440 is comprised of a communication (scanner and computer) power transfer cable(s) to supply light, data, and power to deflectors, e.g., Cambridge Scanners and Cambridge Scanner amplifiers, manufactured by Cambridge Technology, Inc., Cambridge, Mass., in the projection head and a fiber optic cable (or a bundle of fiber optic cables) to transfer light from the light source in ECU 1410 to the projection head 1430.

Umbilical cable 1440 is sheathed with kevlar, steel, or the like, or it may have a strengthened core of kevlar, steel, or the like, (or a combination of sheathing and a strengthened core) to prevent damage to cord 1440 as a result of hovering balloon 1430 separating from ECU 1410. Umbilical cord 1440 is strengthened to reduce the effects of wind on system 1400 by allowing cord 1440 to withstand being pulled against the relatively heavy ECU 1410. However, cord 1440 also must be resistant to the effects of exposure to the elements, especially rain, spray, and condensing fog or mist. Moisture may adversely effect the performance of the fiber optic cable or cables.

In another embodiment, system 1400 includes a first coupler 1450 which joins umbilical cable 1440 to ECU 1410. First coupler 1450 further includes a first junction 1470 which pivotally connects umbilical cord 1440 to first coupler 1450. Similarly, projection head 1480 includes a second coupler (not shown) which joins umbilical cable 1440 to the deflectors in projection head 1480. In addition, a second junction 1460 pivotally connects umbilical cable 1440 to second coupler (not shown) in projection head 1480. In still another embodiment, cable 1440 may be attached directly to points 1480 and 1450, if twisting forces are accounted for during use.

Figure 15A:
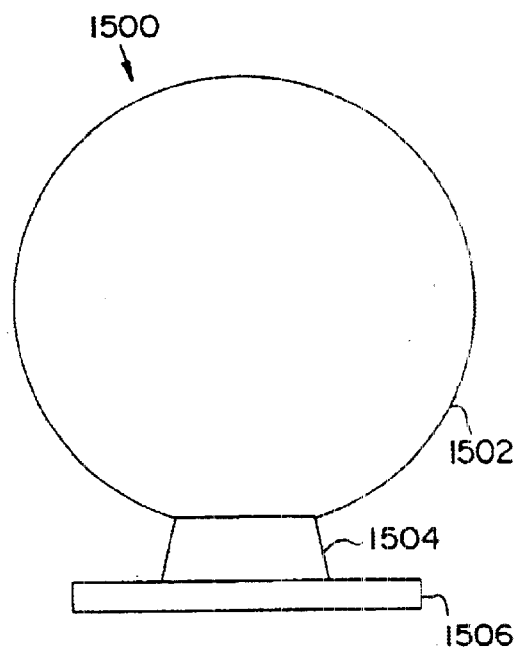
FIGS. 15a–c depict a side, a front, and a cut-away, overhead view of a viewing surface balloon, respectively, mounted on a float or barge.
Figure 15B:
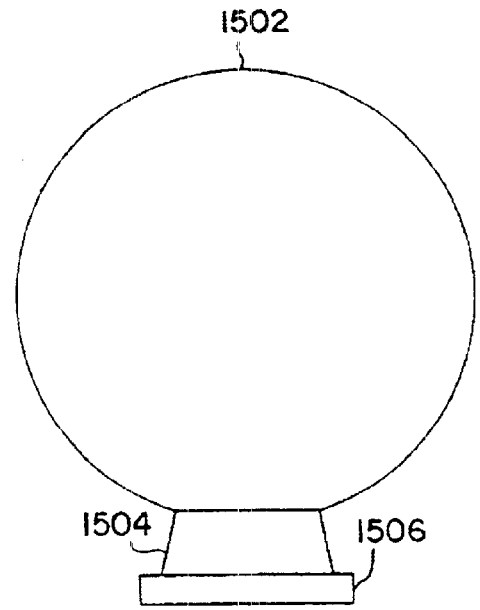
Figure 15C:
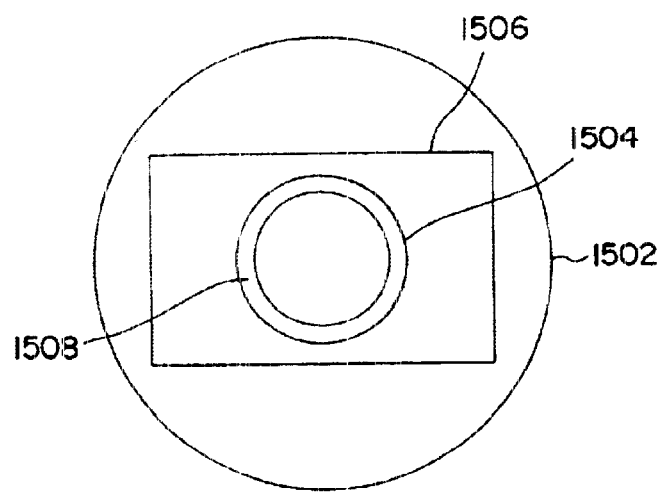

FIGS. 15*a–c* depict a side, a front, and a cut-away, overhead view of a viewing surface balloon 1502, respectively, mounted on a float or barge 1506. A reverse projection and display system 1500 includes balloon 1502 affixed to a projection head housing 1504. Housing 1504 protects a projection head (not shown) from waves and spray. Both balloon 1502 and housing 1504 are mounted on a barge or float 1506. As shown in FIGS. 15*a* and 15*b*, because balloon 1502 is inflated with helium or heated air, float or barge 1506 may be relatively small. An ECU (not shown) may be mounted within housing 1504 or an umbilical cable (not shown) may send light, data, and power to the projection head. FIG. 15*c* depicts a cut-away, overhead view of balloon 1502 mounted on float or barge 1506. The projection head is not shown, but a collar 1508 is depicted in the center of balloon 1502 and float or barge 1506.

Figure 16:
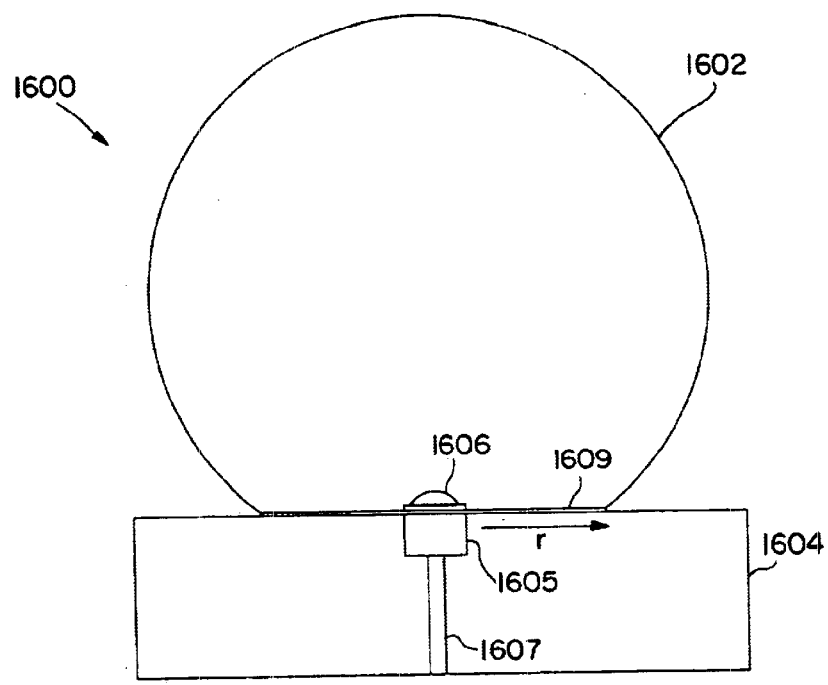
FIG. 16 depicts a cross-sectional view of another embodiment of a viewing surface and the float or barge upon which it is mounted.

FIG. 16 depicts a cross-sectional view of another embodiment of a viewing surface 1602 and a float or barge 1604, upon which it is mounted. A reverse projection and display system 1600 includes balloon 1602 and a projection head 1605 with a lens 1606. A conduit 1607 enters barge or float 1604 from below and guides an umbilical cable 1608 to projection head 1605. Balloon 1602 is mounted on a large collar 1609 of radius r. Radius r of collar 1609 may be large enough, such that maintenance personnel may walk around projection head 1605 and lens 1606. Further, by using a large diameter, flat collar, such as collar 1609, reverse projection and display system 1600 may readily be affixed to existing structures.

Figure 17:
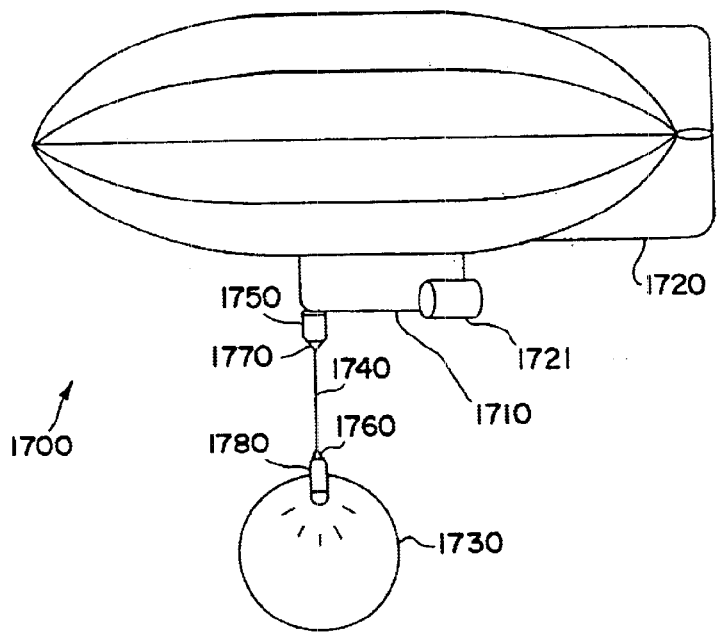
FIG. 17 depicts a balloon-mounted projection head suspended beneath an airship.

Referring to FIG. 17, a mobile, reverse projection system 1700 is depicted comprising an electronic control unit (ECU) 1710 and a projection head 1780 mounted on a balloon 1730. A frame or collar (not shown) forms an air-tight seal between balloon 1730 and projection head 1780. ECU 1710 and all its components may be weather tight and its environment may be controlled to protect the precision optical and electronic equipment carried therein. In an embodiment, ECU 1710 may be mounted on an airship 1720, such as a blimp, a dirigible, or a zeppelin, which may be towed or may include a motor or engine 1721, so that ECU 1710 may be self-propelled. Projection head 1780 and ECU 1710 are joined by an umbilical cord 1740. Umbilical cable 1740 is comprised of a communication (scanner and computer) power transfer cable(s) to supply light, data, and power to deflectors, e.g., Cambridge Scanners and Cambridge Scanner amplifiers, manufactured by Cambridge Technology, Inc., Cambridge, Mass., in the projection head and a fiber optic cable (or a bundle of fiber optic cables) to transfer light from the light source in ECU 1710 to the projection head 1730.

Umbilical cable 1740 is sheathed with kevlar, steel, or the like, or it may have a strengthened core of kevlar, steel, or the like, (or a combination of sheathing and a strengthened core) to prevent damage to cord 1740 as a result of hovering balloon 1730 separating from ECU 1710. Umbilical cord 1740 is strengthened to reduce the effects of wind on system 1700 by allowing cord 1740 to withstand being pulled against the relatively heavy ECU 1710. However, cord 1740 also must be resistant to the effects of exposure to the elements, especially rain and condensing fog or mist. Moisture may adversely effect the performance of the fiber optic cable or cables.

In another embodiment, system 1700 includes a first coupler 1450 which joins umbilical cable 1740 to ECU 1710. First coupler 1750 further includes a first junction 1770 which pivotally connects umbilical cord 1740 to first coupler 1750. Similarly, projection head 1780 includes a second coupler (not shown) which joins umbilical cable 1740 to the deflectors in projection head 1780. In addition, a second junction 1760 pivotally connects umbilical cable 1740 to second coupler (not shown) in projection head 1780. In still another embodiment, cable 1740 may be attached directly to points 1780 and 1750, if twisting forces are accounted for during use.

Other embodiments of the invention will be apparent to those skilled in the art from a consideration of this specification or practice of the invention disclosed herein. It is intended that the example be considered as exemplary only and not limiting on the scope of the invention.

What is claimed is:

1. A mobile, reverse projection system comprises an electronic control unit (ECU) and a projection head mounted on a balloon, wherein said projection head and said ECU are joined by an umbilical cord and said umbilical cord comprises at least one power transfer cable to supply power to a plurality of deflectors in said projection head and at least one fiber optic cable to transfer light from a light source in said ECU to said projection head for projection within said balloon.

2. The system of claim 1, wherein said umbilical cord is sheathed with a material selected from the group consisting of a metal, a polymer, a composite material including glass fibers, or combinations thereof.

3. The system of claim 1 or 2, wherein said umbilical cord has a strengthened core of a material selected from a group consisting of a metal, a polymer, a composite material including glass fibers, or combinations thereof.

4. The system of claim 1, further comprising a first coupler which joins said umbilical cord to said ECU.

5. The system of claim 1 or 4, wherein said projection head includes a second coupler which joins said umbilical cord to said deflectors in said projection head, wherein a second junction pivotally connects said umbilical cord to said second coupler in said projection head.

6. The system of claim 1, wherein said ECU has a plurality of wheels.

7. The system of claim 4, wherein said first coupler includes a first junction which connects said umbilical cord to said first coupler.

8. The system of claim 7, wherein said first junction pivotally connects said umbilical cord to said first coupler.

9. The system of claim 1, wherein said balloon is partially transparent, such that at least a portion of said light projected with said balloon escapes from within said balloon.

10. The system of claim 1, wherein said ECU is carried on an aircraft.

11. The system of claim 10, wherein said balloon and projection head are suspended beneath said ECU.

12. The system of claim 1, wherein said ECU is carried on a watercraft.

* * * * *